United States Patent [19]

Brusewitz

[11] Patent Number: 5,966,181
[45] Date of Patent: Oct. 12, 1999

[54] VIDEO CODING SYSTEM WITH BUFFER CONTROL QUANTIZATION STEP SIZE

[75] Inventor: Harald Brusewitz, Älvsjö, Sweden

[73] Assignee: Televerket, Farsta, Sweden

[21] Appl. No.: 08/249,081

[22] Filed: May 25, 1994

Related U.S. Application Data

[63] Continuation of application No. 07/964,269, Oct. 21, 1992, abandoned.

[30] Foreign Application Priority Data

Nov. 15, 1991 [SE] Sweden ................................. 9103381

[51] Int. Cl.⁶ ....................................................... H04N 7/24
[52] U.S. Cl. ............................................................... 348/419
[58] Field of Search .......................... 358/133, 135, 358/136; 348/405, 419, 390, 384; H04N 7/13, 7/133, 7/137

[56] References Cited

U.S. PATENT DOCUMENTS

| | | |
|---|---|---|
| 4,580,162 | 4/1986 | Mori . |
| 4,672,441 | 6/1987 | Hoelzlwimmer et al. . |
| 4,894,713 | 1/1990 | Delogne et al. ........................ 358/136 |
| 4,897,855 | 1/1990 | Acampora ............................... 358/136 |
| 4,969,040 | 11/1990 | Gharavi . |
| 5,025,482 | 6/1991 | Murakami et al. ..................... 358/136 |
| 5,038,209 | 8/1991 | Hang . |
| 5,196,933 | 3/1993 | Henot ...................................... 358/133 |

FOREIGN PATENT DOCUMENTS

| | | |
|---|---|---|
| 0 382 892 | 8/1990 | European Pat. Off. . |
| 0 396 846 | 11/1990 | European Pat. Off. . |
| 0 424 060 | 4/1991 | European Pat. Off. . |
| 0 434 427 | 6/1991 | European Pat. Off. . |
| 127379 | 1/1989 | Japan ............................ H04N 7/137 |
| 2 238 444 | 5/1991 | United Kingdom . |
| WO 91/14339 | 9/1991 | WIPO . |

Primary Examiner—Bryan Tung
Attorney, Agent, or Firm—Oblon, Spivak, McClelland, Maier & Neustadt, P.C.

[57] ABSTRACT

A method and device for image coding, primarily intended to be applied in the transmission of video signals, convert a video signal to a bit stream by coding and quantising. The bit stream is stored in a buffer store before it is sent at a constant bit rate on a transmission line. The content in the buffer store is regulated by varying the step height in the quantiser. With the frame rate at the input being known and the frame rate and bit rate at the output being known, the ideal buffer store content can be determined. The actual buffer store content is sensed and compared with the ideal buffer store content and the difference between these two values is determined. The step height in the quantiser is adjusted as a function of the difference.

5 Claims, 3 Drawing Sheets

5,966,181

VIDEO CODING SYSTEM WITH BUFFER CONTROL QUANTIZATION STEP SIZE

This application is a Continuation of application Ser. No. 07/964,269 filed on Oct. 21, 1992, now abandoned.

BACKGROUND OF THE INVENTION

The invention relates to a method and to a device for image coding of a video signal.

It is primarily intended that the method and device according to the present invention should be utilised in the transmission of video signals that are used, for example, in video telephony. In order to obtain good quality signals for such use, the video signal is converted into a digital signal. The format of the digital signal is specified by the International Consultative Committee for Telegraphs and Telephones (CCITT) H.261 standard. However, the method of digitisation of the video signal can be selected independently by the user.

The transmission of a digital signal is traditionally carried out with the aid of a number of circuits which are frequently divided into a video input signal section, a coder core and a video multiplexer (VMUX). The video input signal section effects suitable signal processing of the video input signal. The coder core effects some form of transformation coding of the signal which can be predictive (INTER) or non predictive (INTRA). After the transformation coding, the signal is quantised.

The digital bit stream is then subjected to further code processing by the VMUX in order to effect compression of the bit stream. Traditionally, run length coding, variable length coding and error correction are also effected. The operation of the VMUX is normally effected by means of a signal processor. Since these codings produce different numbers of bits per frame and the bit rate on the transmission line at the output of the image coding device is constant, the VMUX contains a buffer store.

Problems experienced with the known technology relate to the prevention of overflow in the buffer store and the buffer being emptied prematurely. Both of these problems give rise to a deterioration in image quality. At the same time, the content of the buffer store should be as small as possible.

It is an object of the present invention to overcome the foregoing by arranging for the content of the buffer store to be regulated by adjusting the step height in the quantising arrangements as a function of the difference between an actual and an ideal value for the content of the buffer store.

SUMMARY OF THE INVENTION

The invention provides a method for image coding a video signal having a known frame rate, including the steps of coding and quantising the video signal to effect digitalisation and compression of the signal to form a bit stream having a bit rate determined by the transmission line on which the bit stream is to be transmitted, storing the bit stream in a buffer store, monitoring the content of the buffer store, sensing the rate of the bit stream at the output of the buffer store, calculating the ideal buffer store content, and adjusting the step height in the quantiser as a function of the difference between the monitored and ideal buffer store contents.

According to one feature of the method according to the present invention, the ideal buffer store content is as follows:

$$(GOB-1+MB/33)/12 \times (k1+g)R/fo+bR/fo$$

where
GOB is the number of the block group,
MB is the number of the macroblock,
k1 is the number of skipped frames which are determined by the coder,
fo is the bit rate of the video signal,
R is the bit stream rate,
g takes into account when the coding is terminated, and
bR/fo is the minimum allowed content in the buffer.

The invention also provides a device for image coding of a video signal having a known bit rate in accordance with the method according to the invention.

The device is preferably constructed as an integrated circuit, for example, a VLSI circuit.

The foregoing and other features according to the present invention will be better understood from the following description with reference to the accompanying drawings, in which:

Figure 1:
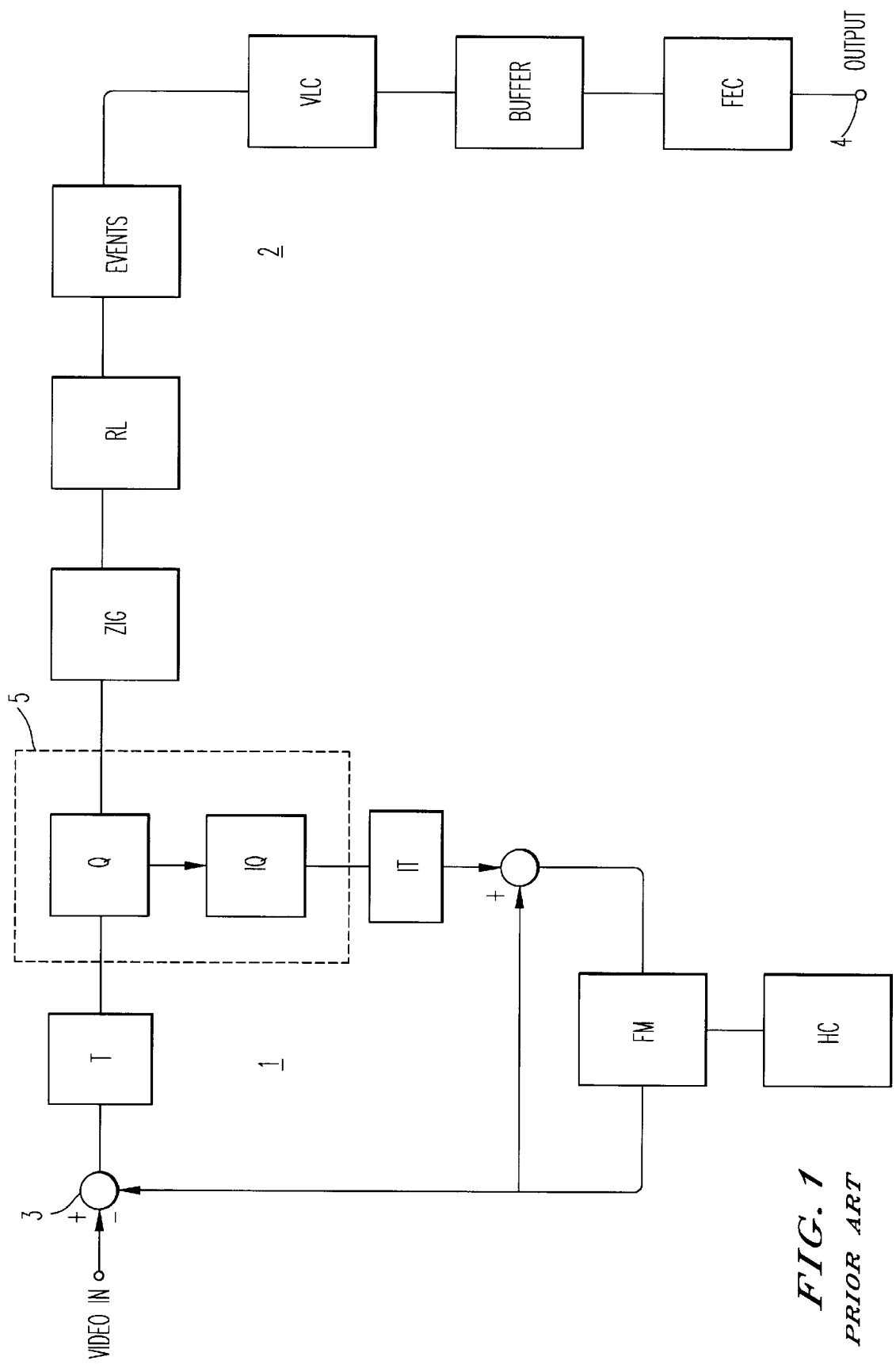
FIG. 1 illustrates in the form of a block diagram a known image coding device which comprises a coder core and a VMUX.

The basic design of a known image coding device is illustrated in FIG. 1 of the drawings and comprises a coder core 1 and a VMUX 2. A video signal with a frame rate fo is applied to the input of the coder core 1 via a limiter or other input device (not illustrated). The input signal is applied to a transformation coder T via a subtraction circuit 3. The signal is transformed by the coder T and then quantised in a quantiser Q. The coder core 1 normally utilises some form of predictive coding for the frame which is subtracted from the video signal by means of the subtraction circuit 3. Inverse quantisation and inverse transformation are then respectively effected by means of an inverse quantiser IQ and an inverse transformation coder IT. A frame memory FM and possibly a motion estimator ME are utilised in the prediction.

The output of the coder core 1 i.e. an output of the quantiser Q, is connected to the input of the VMUX 2 which comprise a scanning arrangement, ZIG, the input of which forms the input of the VMUX, a run length coding arrangement, RL, an arrangement, EVENTS, which supports the run length coding, a variable-length coding arrangement, VLC, a buffer store and an error correction arrangement, FEC, which are connected in cascade and which operate in a manner that is well known by persons skilled in the art.

In the VMUX, the video signal is processed in a manner whereby it can be sent as economically as possible on a transmission line (not illustrated) that would normally be connected to the output 4 of the FEC. The signal must also be adapted to the bit rate R on the transmission line. The bit rate is derived from a clock at the output 4.

The operation of the VMUX is traditionally effected by means of a programmed signal processor.

In practice, the quantisers 5 may form part of either the coder core 1 or the VMUX 2. In the preferred embodiment of the present invention, as illustrated in FIG. 2 of the drawings, the quantisers 5 are included in the VMUX but they could be by-passed in such a manner that the VMUX could optionally be used together with coder cores either with or without quantisers.

The function of the buffer store is to release bits at a clock rate which is controlled by the bit rate on the transmission line. Since the coding of the video signal produces different numbers of bits per frame depending, amongst other things, on the content of the frame, the content of the buffer store can vary. It is important to note that there should not be any overflow in the buffer store because this would result in the information on the frames being irretrievably lost. Furthermore, the buffer store content should be as small as possible in order to reduce delay, that is to say, the time during which the bits are stored in the buffer store. It should also be insured that the buffer store rarely becomes empty because it would then be necessary to stuff redundant bits into the bit steam and this would give rise to a deterioration in the quality of the image.

The format of the bit stream is given by the CCITT standard referred to above. One frame consists of twelve block groups which are designated as GOB and each block group consists of 33 macroblocks which are designated as MB. The frame rate fo of the video signal at the input of the image coding device is generally at 30 Hz.

Figure 2:
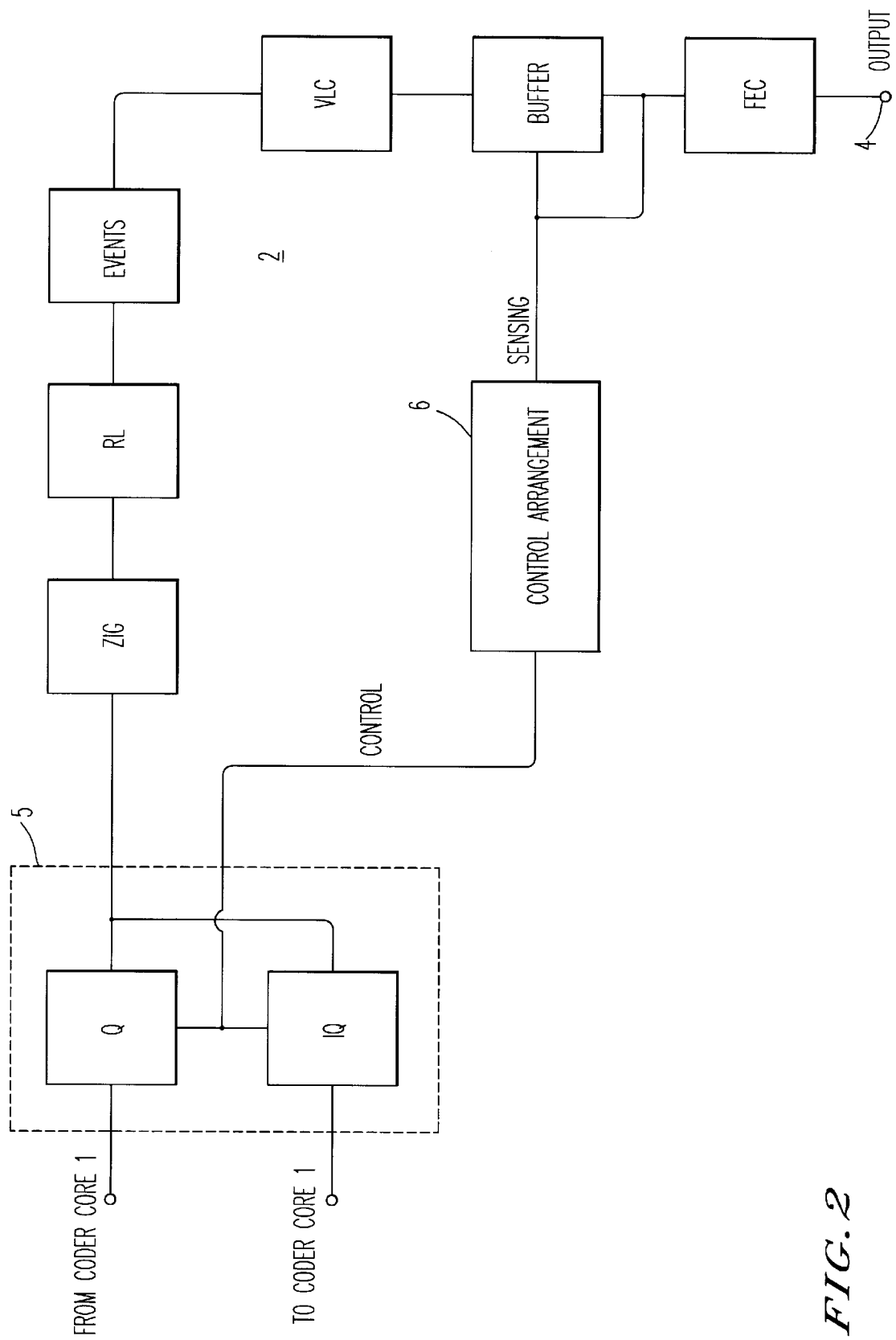
FIG. 2 illustrates in the form of a block diagram an image coding device according to the present invention.

With the embodiment of the present invention, as illustrated in FIG. 2 of the drawings, the content B of the buffer store is regulated by varying the step height in the quantiser Q. The function of the control arrangement 6, as is illustrated in FIG. 2, is to sense not only the content B of the buffer store but also the bit rate R at the output of the buffer store. The control arrangement 6 calculates the ideal buffer store content, which is designated as Bideal, and compares it with the actual value. The control arrangement 6 calculates the difference between the actual and ideal values and changes the step height in the quantiser Q as a function of the difference value. Control signals at the output of the control arrangement 6 are applied to both the quantiser Q and the inverse quantiser IQ. If the quantising arrangements are included as part of the coder core, then the control signals will be applied to the coder core quantisers.

Figure 3:
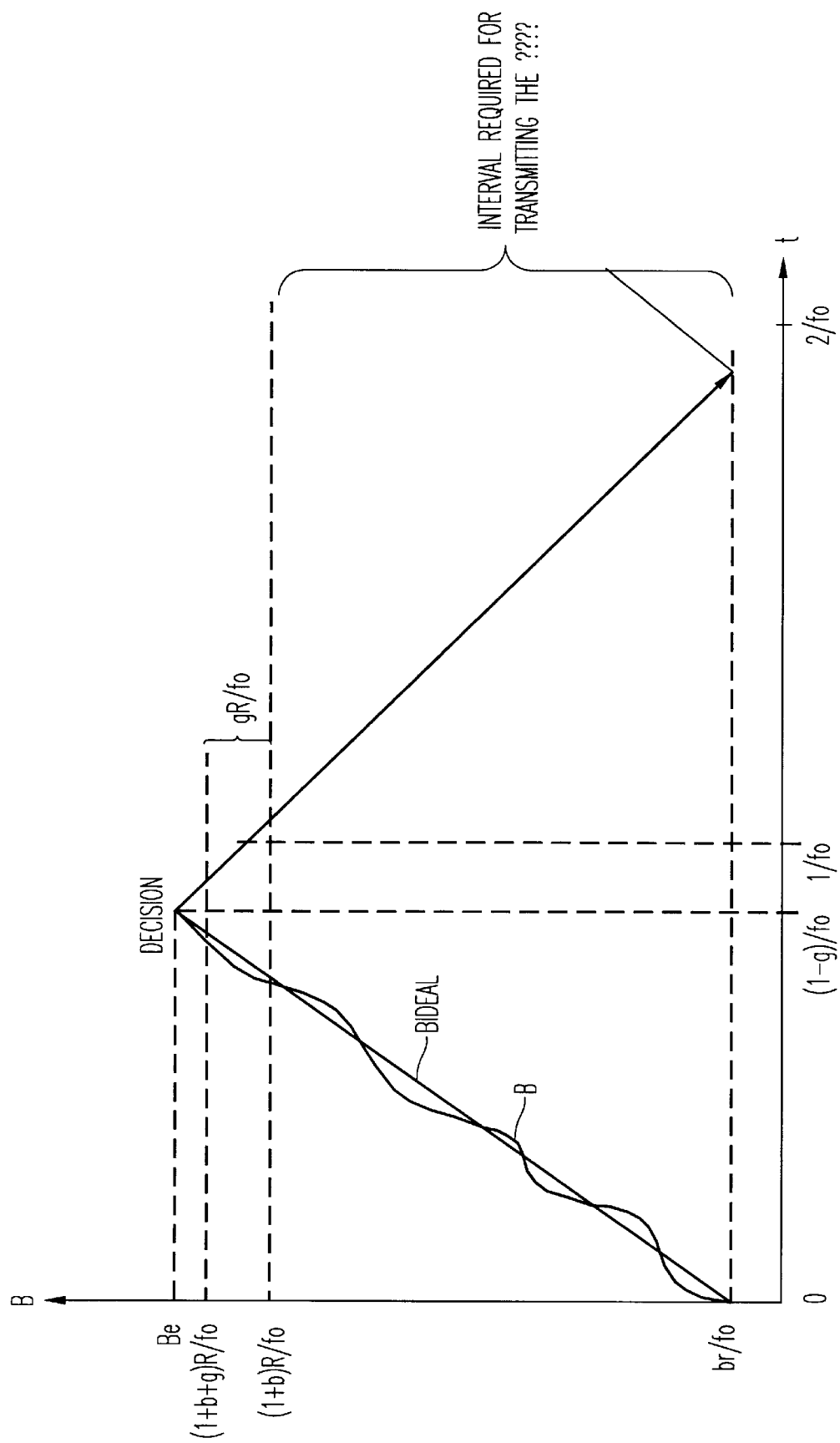
FIG. 3 shows a curve of the buffer store content with respect to time according to a preferred embodiment of the invention.

FIG. 3 shows an example of how the buffer store content changes during operation of a preferred embodiment of the invention. One frame is coded in 1/fo seconds, or more specifically in (1−g)1/fo seconds, where the value of g takes into account when the coding is terminated. During this time, the buffer store content increases to a value which is designated Be. According to another technique, a number of frames k are skipped in order to limit the buffer store content. The number $k \geq k0$ which is the number of skipped frames that are required by the decoder in the receiver. The number k is also based on the bit rate R at the output of the buffer store.

In the following (k+g)/fo seconds, no bits are produced and as a result of this the content of the buffer store is reduced. The rate of reduction is R which is sensed at the buffer store output. In order to achieve the desired frame rate with k1 skipped frames, the content of the buffer store at the end of frame coding should ideally be as follows:

$$Be = (k1+b+g)R/fo$$

if the frame rate is fo Hz at the input of the image coding device and bR/fo is the minimum allowed buffer store content.

If Be is less than (k0+b+g)R/fo, then the coder has to carry out bit stuffing for a period of time before the coding of the next frame can commence.

In the coding, "empty buffer" is consequently defined as a linear increase from 0 to (k0+b+g)R/fo in 1/fo seconds.

$$B_{empty} = \frac{\left(GOB - 1 + \frac{MB}{33}\right)}{12} \times (k_0 + b)\frac{R}{f_0}$$

In the same way, the ideal buffer store content (which is the only one that needs to be derived in the circuit) is derived as $$Bideal = (GOB-1+MB/33)/12 \times (k1+g)R/fo + bR/fo$$

k+g or k1+0 to 3 the number of macroblocks. Bideal is consequently the content which the buffer store must have in order to be emptied to the minimum limit of bR/fo in k1+1 frame intervals.

The number of bits which are produced in the quantisation process is naturally based on the step height; the higher the step height the fewer the bits that are produced. According to the invention, the step height is changed at the beginning of each block group so that the buffer store content can come close to the ideal value. The following decision rules are used.

The step height QUANT is, as indicated by the following formula, a function of the deviation Bdev from the ideal buffer store content:

$$QUANT = f(Bdev) = f(B - Bideal).$$

where the function f is constant for intervals of Bdev values.

The threshold values for f are designated Bx and can be derived from values stored in a BOOT-PROM. To be able to handle different bit rates, the Bx values are as indicated by the following formula, in terms of the factors of R/fo:

$$Tx = B - Bideal - Bx \, R/fo$$

In order to simplify the calculation of QUANT, certain terms must be derived for each frame and for each macroblock.

FOR THE FIRST MB IN EACH GOB
 T0≧0−>QUANT=QUANT+3
 T1≧0−>QUANT=QUANT+2
 T2≧0−>QUANT=QUANT+1
 T3<0−>QUANT=QUANT−1
 T4<0−>QUANT=QUANT−2
 T5<0−>QUANT=QUANT−3
FOR MB WITHIN GOB
 T6≧0−>QUANT=QUANT+1
 T7<0−>QUANT=QUANT−1

The step height is limited to a certain interval.
 QUANTmin≦QUANT≦QUANTmax

It has been decided to limit step height since a step height <QUANTmin does not bring about any real improvement in the image quality, while a step height >QUANTmax produces a bad image. To regulate the buffer store content in such situations, other techniques need to be used instead, such as bit stuffing and frame skipping.

In general, different step heights are used for the INTER case and the INTRA case. According to the present invention, modified step height QUANT is used for INTRA blocks and switching-over is done on a block basis by using a variable Qmod which specifies the difference for the INTRA case. This provides:

QUANTINTRA=QUANT+Qmod;

QUANTminINTRA≦QUANTINTRA≦QUANTmaxINTRA

To calculate Bideal, k1 which specifies the required number of skipped frames, must be known and is a function of R/fo, that is to say the bit rate at the output divided by the frame rate of the video signal. The frame rate of the video signal is generally 30 Hz, whilst R is measured at the output from the buffer store. k1 can only take the values 0, 1, 2, 3 which, provided that k0=0, provides the frame rates 30, 15, 10 and 7.5 Hz at the output from the buffer store. k1 can be allowed to be based on R by defining R/fo intervals for each value of k1 as follows:

R/fo>RO gives k1=max (0, k0)

RO≧R/fo>R1 gives k1=max (1, k0)

R1≧R/fo>R2 gives k1=max (2, k0)

R2≧R/fo gives k1=max (3, k0)

The frame speed at the output is selected in such a manner that the number of bits per frame does not become too small. An example of selected frame rates with different standard bit rates R at the output is given below:

30 Hz for R>384 kbit/s

15 Hz for R>128 kbit/s

10 Hz for R>64 kbit/s 7.5 Hz for R<64 kbit/s which provides the interval limits R2=2133, R1=4267, R0=12800 for fo=30 Hz.

The device according to the present invention is preferably constructed as an integrated circuit, for example, a VLSI circuit.

The different parameter values required from outside are stored in a BOOT-PROM in accordance with the table shown below.

PARAMETERS STORED IN THE BOOT-PROM

|  | Number of values |
|---|---|
| 1 + b + g | 2 |
| R0–R2 | 3 |
| Bx + b for x = 0 to 10 | 11 |
| K + g or g for K1 = 0 to 3 | 4 |
| QUANTmin, QUANTmax | 2 |
| Qmod | 1 |
| QUANTminINTRA, QUANTmaxINTRA | 2 |

CIF is common intermediate format and QCIF stands for a quarter common intermediate format as defined in CCITT recommendation H261.

The problem with the buffer control is thus solved by the present invention by adjustment of the step height in the quantising arrangement.

The invention can also be combined with other techniques that will be directly evident to persons skilled in the art.

We claim:

1. A method for image coding a video signal having a known frame rate comprising the steps of:

coding and quantising the video signal to effect digitalisation and compression of the signal to form a bit stream having a bit rate determined by the transmission line on which the bit stream is to be transmitted;

storing the bit stream in a buffer store, monitoring the content of the buffer store;

sensing the rate of the bit stream at the output of the buffer store, the ideal buffer store content being as follows $$(GOB-1+MB/33)/12 \times (k1+g)R/fo+bR/fo$$

where GOB is the number of the block group,

MB is the number of the macroblock, k1 is the number of skipped frames which are determined by the coder, fo is the frame rate of the video signal, R is the bit stream rate, g takes into account when the coding is terminated, and bR/fo is the minimum allowed content in the buffer; and adjusting the step height in the quantiser as a function of the difference between the monitored and ideal buffer store contents as follows $$QUANT=f(B-Bideal)$$

where B is the buffer store content,

Bideal is the ideal buffer store content, and f assumes constant values for intervals of values of B−Bideal and lies within the interval QUANTmin≦QUANT≦QUANTmax where QUANTmin and QUANTmax are respectively the minimum and maximum permitted step heights.

2. A method as claimed in claim 1, wherein the number of skipped frames determined by the coder is a function of the bit rate of the signal at the output of the buffer store and the frame rate of the video input signal whereby the number of bits per frame is not less than a predetermined value and is necessarily higher than the number of skipped frames required by the decoder in the receiver.

3. A method for image coding a video signal having a known frame rate comprising the steps of:

coding and quantising the video signal to effect digitalisation and compression of the signal to form a bit stream having a bit rate determined by the transmission line on which the bit stream is to be transmitted;

storing the bit stream in a buffer store such that $$(GOB-1+MB/33)/12 \times (k1+g)R/fo+bR/fo$$

where GOB is the number of the block group,

MB is the number of the macroblock, k1 is the number of skipped frames, which are determined by the coder, fo is the frame rate of the video signal, R is the bit stream rate, g takes into account when the coding is terminated, and bR/fo is the minimum allowed content in the buffer;

monitoring the content of the buffer store;

sensing the rate of the bit stream at the output of the buffer store, calculating the ideal buffer store content, and adjusting the step height in the quantiser as a function of the difference between the monitored and ideal buffer store contents.

4. A method as claimed in claim 3, wherein the adjustment QUANT to the step height in the quantiser is calculated as follows:

$$QUANT=f(B-Bideal)$$

where

B is the buffer store content,

Bideal is the ideal buffer store content, and f assumes constant values for intervals of values of B−Bideal and lies within the interval QUANTmin≦QUANT≦QUANTmax where QUANTmin and QUANTmax are respectively the minimum and maximum permitted step heights.

5. A method as claimed in claim 3 wherein the ideal buffer store content is as follows:

$$(GOB-1+MB/33)/12 \times (k1+g)R/fo+bR/fo$$

where

GOB is the number of the block group,

MB is the number of the macroblock, k1 is the number of skipped frames which are determined by the coder, fo is the frame rate of the video signal, R is the bit stream rate, g takes into account when the coding is terminated, and bR/fo is the minimum allowed content in the buffer, and wherein the number of skipped frames, k1, determined by the coder is a function of the bit rate, R, of the signal at the output of the buffer store and the frame rate, fo, of the video input signal whereby the number of bits per frame is not less than a predetermined value and is necessarily higher than the number of skipped frames required by the decoder in the receiver.

* * * * *